US012663340B2

(12) United States Patent　(10) Patent No.: US 12,663,340 B2
Hell et al.　(45) Date of Patent:　Jun. 23, 2026

(54) TEST STAND FOR THE POWERTRAIN OF A MOTOR VEHICLE

(71) Applicant: ZF Friedrichshafen AG, Friedrichshafen (DE)

(72) Inventors: Christian Hell, Untergriesbach (DE); Thomas Dollinger, Passau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 243 days.

(21) Appl. No.: 18/563,489

(22) PCT Filed: May 24, 2022

(86) PCT No.: PCT/EP2022/064046
§ 371 (c)(1),
(2) Date: Nov. 22, 2023

(87) PCT Pub. No.: WO2022/248467
PCT Pub. Date: Dec. 1, 2022

(65) Prior Publication Data
US 2024/0230467 A1　Jul. 11, 2024

(30) Foreign Application Priority Data
May 27, 2021　(DE) ..................... 10 2021 205 369.6

(51) Int. Cl.
*G01M 13/025*　(2019.01)
*G01L 3/14*　(2006.01)
(52) U.S. Cl.
CPC ......... *G01M 13/025* (2013.01); *G01L 3/1457* (2013.01)
(58) Field of Classification Search
CPC ................................................ G01M 13/025
See application file for complete search history.

(56) References Cited

U.S. PATENT DOCUMENTS 6,006,611 A　*　12/1999　Galvin ................... G01L 3/242
73/862.16
7,104,118 B2　9/2006　Tentrup et al.
(Continued)

FOREIGN PATENT DOCUMENTS

DE　103 17 304 A1　4/2003
DE　43 28 537 A1　3/2023
WO　2009050053 A1　4/2009

OTHER PUBLICATIONS

European Patent Office, International Search Report issued in International patent application No. PCT/EP2022/064046 (Sep. 2, 2022).

(Continued)

*Primary Examiner* — Eric S. McCall
(74) *Attorney, Agent, or Firm* — Secant IP, PLLC

(57) ABSTRACT

The invention relates to a test stand (100) for a powertrain of a motor vehicle (20). The test stand includes at least one loading motor (110) with a motor housing (111) and a motor shaft (112), at least one torque sensor (120), and at least one static module (130), wherein the motor shaft (112) is designed to be drivingly connected to a hub (21) of the motor vehicle (20) and wherein the torque sensor (120) is designed to detect a torque produced by the loading motor (110). The test stand (100) according to the invention is distinguished in that the at least one torque sensor (120) is arranged on the motor housing (111) in such manner that it blocks a rotation movement of the motor housing (111) relative to a substrate (119) and supports the torque via the motor housing (111) on the substrate (119).

20 Claims, 3 Drawing Sheets

(56)                     References Cited

U.S. PATENT DOCUMENTS

| | | | | |
|---|---|---|---|---|
| 9,109,973 | B2 | 8/2015 | Inhoff et al. | |
| 11,656,153 | B1 * | 5/2023 | Boecker ............... | G01M 13/025 |
| | | | | 73/118.01 |
| 2011/0303000 | A1 * | 12/2011 | Engstrom ......... | G01M 17/0074 |
| | | | | 73/116.06 |
| 2018/0095007 | A1 * | 4/2018 | Mizuta ................ | G01M 15/102 |
| 2019/0383680 | A1 * | 12/2019 | Kiuchi .................... | G01L 3/242 |
| 2019/0391043 | A1 * | 12/2019 | Hell .................... | G01M 13/025 |
| 2020/0225120 | A1 * | 7/2020 | Engström ............. | G01M 17/06 |
| 2020/0284695 | A1 | 9/2020 | Ikeda | |
| 2020/0363277 | A1 * | 11/2020 | Engström ........... | G01M 17/007 |
| 2021/0116316 | A1 | 4/2021 | Schricker et al. | |
| 2024/0175782 | A1 * | 5/2024 | Hell .................... | G01M 17/007 |
| 2024/0241013 | A1 * | 7/2024 | Weber ................ | G01M 13/025 |
| 2025/0334464 | A1 * | 10/2025 | Skutkiewicz ............. | G01L 3/22 |

OTHER PUBLICATIONS

European Patent Office, Written Opinion issued in International patent application No. PCT/EP2022/064046 (Sep. 2, 2022).
German Patent Office, Search Report issued in German patent application No. 10 2021 205 369.6 (Feb. 7, 2022).

* cited by examiner

TEST STAND FOR THE POWERTRAIN OF A MOTOR VEHICLE

RELATED APPLICATIONS

This application claims the benefit under 35 U.S.C. § 371 as a U.S. National Phase Application of application no. PCT/EP2022/064046, filed on 24 May 2022, which claims the benefit of German Patent Application no. 10 2021 205 369.6, filed on 27 May 2021, the contents of which are hereby incorporated herein by reference in their entireties.

FIELD OF THE DISCLOSURE

The invention relates to a test stand for a powertrain of a motor vehicle, according to the present disclosure.

BACKGROUND

Transmission test stands or powertrain test stands for testing motor vehicle transmissions or complete motor vehicle powertrains are known from the prior art. Such test stands are usually used for quality control in order to recognize functional defects in powertrains at an early stage by means of a series of load tests. Typical functional defects arise, for example, in components liable to operate with play such as gearwheels, synchronizer rings, synchronizer bodies, disk-clutch disks and shafts, which are driven and can be excited into vibrations. In the context of such functional testing, as a rule the acoustic behavior and the shifting quality are also tested. Moreover, however, such test stands are used in the development and continual improvement of motor vehicle powertrains.

In this connection DE 43 28 537 C2 describes a transmission test stand with a first servomotor that serves as a drive input motor and a second servomotor that serves as a braking motor. The drive input motor is connected by means of a clutch to the drive input shaft of a motor vehicle transmission to be tested, and among other things its rotation speed is controlled by a PC so that any desired rotation speed variations can be simulated. The braking motor is connected by a further clutch to a drive output shaft of the motor vehicle transmission to be tested. The rotation speed of the braking motor is also controlled by the PC. The rotation speed variations simulated by the PC are rotation speed variations measured in real driving tests. Thus, according to DE 43 28 537 C2 the motor vehicle transmission can be tested before being installed in a motor vehicle.

DE 103 28 461 A1 describes a vehicle test stand with a loading machine for each drivable wheel of a motor vehicle. The loading machines are in this case connected with the wheel rims of the motor vehicle wheels either directly, for example, by means of wheel bolts, or indirectly, for example, via belt drives, so that the loading machines can both drive and brake the powertrain. The test stand of DE 103 28 461 A1 also comprises a frame structure by means of which the motor vehicle and the loading machines are raised and orientated relative to one another. During the testing process the motor vehicle is carried completely by the frame structure, so the wheels are not in contact with the ground.

SUMMARY

The known motor vehicle test stands, however, have the disadvantage that particularly when they are provided for testing a powertrain already installed in a motor vehicle, they occupy a comparatively large area, and above all, they require a complex and expensive mechanical supporting structure.

The purpose of the present invention is to propose an improved test stand for a powertrain of a motor vehicle.

According to the invention, this objective is achieved by the test stand for a powertrain of a motor vehicle according to the present disclosure. Advantageous design features emerge from the present disclosure.

The invention relates to a test stand for a powertrain of a motor vehicle, comprising at least one loading motor with a motor housing and a motor shaft, at least one torque sensor and at least one static module, wherein the motor shaft is designed to be drivingly connected to a hub of the motor vehicle and wherein the torque sensor is designed to detect a torque produced by the motor. The test stand according to the invention is distinguished in that the at least one torque sensor is arranged on the motor housing in such manner that it blocks a rotation movement of the motor housing relative to a substrate and supports the torque by way of the motor housing on the substrate.

Thus, the invention describes a test stand which is suitable for testing a powertrain of a motor vehicle. The motor vehicle can equally well be an electric-motor-powered motor vehicle or a conventionally powered motor vehicle.

For this, the test stand comprises at least one loading motor. The loading motor is advantageously an electric motor. Electric motors are comparatively compact and compared with internal combustion engines they produce a wide range of rotation speeds and advantageously have a broad rotation speed range of the maximum torque. Only when the so-termed "key point" is reached in a comparatively high rotation speed range does the torque decrease owing to the progressive weakening of the field, which is indirectly proportional to the further increasing rotation speed.

Preferably, it is provided that the at least one loading motor is in the form of a permanently excited synchronous motor. Particularly advantageously, the synchronous motor has a comparatively large number of magnetic pole pairs, for example, twelve or more magnetic pole pairs. Such synchronous motors are also known as synchro-torque motors. This has the advantage that the loading motor can be made comparatively compact and short, which consequently also results in a position of the center of gravity of the loading motor very close to the chassis of the motor vehicle.

Advantageously, each loading motor is associated with an inverter of its own. The inverter is for example of three-phase design.

The at least one loading motor comprises a motor housing that accommodates the loading motor. The motor housing is for example of cylindrical shape.

The motor housing can be water-cooled, for example.

Finally, the at least one loading motor also has a motor shaft which delivers the torque and the rotation speed produced by the loading motor. The motor shaft can be connected rotationally fixed to one of the hubs of the motor vehicle's wheels, so that a torque and a rotation speed can be transmitted from the motor shaft into the hub. The torque and the rotation speed together represent a mechanical power with which the powertrain to be tested can be acted upon. Thus, the torque and the rotation speed represent the loading of the powertrain to be applied in the context of the test.

In the context of the invention, a driving connection is understood to mean a mechanical connection for the transmission of mechanical power, wherein the torque and the rotation speed can be varied in the context of the transmission from the loading motor to the hub. In other words, the loading motor can, for example, deliver a first rotation speed and a first torque, this first rotation speed and first torque representing the first power transmitted. During the transmission of the first power, the first torque can be changed to a second torque and the first rotation speed to a second rotation speed. However, the first power remains unchanged by the transmission. By virtue of the definition that the motor shaft is or can be drivingly connected to the hub, it is therefore established that there does not have to be a direct mechanical connection, in particular a rotationally fixed connection, between the motor shaft and the hub. Rather, the driving connection can include a transmission or an individual gear ratio or other intermediate elements.

Furthermore, the test stand comprises at least one torque sensor, the torque sensor being designed to detect a torque produced by the loading motor.

The torque sensor preferably comprises one or more force-sensitive elements, in particular one or more strain gauges, which first detect a force acting on the force-sensitive element or on the plurality of force-sensitive elements. By virtue of the geometry of the torque sensor it is then possible, from the force or forces detected, to determine the torque acting at the time.

Preferably, it is provided that in addition a rotation speed of the loading motor is also detected, for example, by way of its control electronics, in particular by way of its inverter. From the known rotation speed and the known torque, the power or the loading can be determined.

The static module is advantageously fitted onto the hub of the motor vehicle in place of a vehicle wheel or in the manner of a vehicle wheel. By means of the static module arranged on the hub, the motor vehicle to be tested is supported on the substrate. Relative to the static module the substrate can have a particularly high coefficient of friction, in order also to enable the transmission of high torques from the loading motor to the static module.

Furthermore, it can be provided that the at least one static module can be connected by friction or with interlock to the substrate. For example, the adhesion of the static module to the substrate can be increased still more if the static module is clamped over its running surface, possibly by means of a tension belt whose ends are firmly connected to the substrate. To improve the adhesion of the static module to the substrate even more, the static module can also, for example, be held onto the substrate by means of a bolt arranged in the substrate and projecting radially outward into the static module.

Preferably, it is provided that the at least one static module has a radially outer portion and a radially middle portion, such that the middle portion is held rotatably in the outer portion and such that the middle portion is designed to be connected rotationally fixed to an axial end of the motor housing. Thus the at least one static module is made in two parts, such that the radially middle portion of the static module can rotate relative to the radially outer portion of the static module. In that case, the loading motor is held by means of its motor housing onto the middle portion of the static module, for example by means of a screw or flange connection. The radially outer portion can therefore rotate relative to the loading motor.

In this case, the static module is not fitted onto the hub of the motor vehicle in the manner of a vehicle wheel, but has a central opening through which the motor shaft of the loading motor can be connected directly to the hub, for example, by means of the wheel flange. This means that the static module in this case is connected to the hub only indirectly by way of the loading motor, since the loading motor is connected on one side via its motor housing to the middle portion of the static module and on the other side via its motor shaft to the hub of the motor vehicle.

Alternatively preferred, besides its radially outer portion and the radially middle portion, the static module can also have a central inner portion which, for its part, is held rotatably in the radially middle portion. In this case the static module can be mounted rotationally fixed on the hub of the motor vehicle by way of the said central inner portion. Likewise, the motor shaft of the loading motor can also be arranged rotationally fixed on the central inner portion, so that the motor shaft and the hub of the motor vehicle are in driving connection with one another via the central inner portion.

Very particularly preferably, it is provided that a rotation of the middle portion relative to the outer portion can be blocked. The blocking can be done, for example, by displacing bolts or sliders provided for the purpose, or by positioning a clamping element, so that a movement of the outer portion relative to the middle portion is blocked. This has the advantage that the motor vehicle can even move under its own power and can therefore be positioned and orientated appropriately for the test in a simple manner. For example, a correspondingly blockable static module can be fitted at each wheel to be tested and then the motor vehicle can be driven within the testing area, for example, within a large workshop, from the place where the static modules are fitted to the place where the test is to take place.

According to the invention, it is now provided that the at least one torque sensor is arranged on the motor housing in such manner that a rotation movement of the motor housing relative to a substrate is blocked and the torque is supported on the substrate by way of the motor housing. In other words, the loading motor is thereby supported on the substrate in such manner that it can transmit a rotation speed and a torque to the hub of the motor vehicle. The torque sensor can correspondingly be fixed both to the motor housing and to the substrate. Thus, the load produced by the loading motor can be transmitted in the power flow direction into the hub of the motor vehicle and hence into the powertrain, and in the direction opposite to the power flow direction the loading motor can support the load via the motor housing and the torque sensor to the substrate.

Since the loading motor and the radially middle portion of the static module connected rotationally fixed to the loading motor via its motor housing do not rotate during the testing process, this has the advantage that during a testing process the motor vehicle remains stationary on the substrate, since during the testing process exclusively the motor shaft and the hub of the motor vehicle can rotate.

A further advantage is that during the testing process the torque sensor does not undergo a rotation movement, which could otherwise affect the measurement values of the sensor adversely owing to the centrifugal forces that result from the rotation.

Since the at least one torque sensor is also advantageously not in the torque flow from the loading motor to the hub, the mechanical connection from the loading motor to the hub can be made comparatively short, which also improves the rigidity of the connection.

Thus, the invention describes a very compact test stand for testing a powertrain of a motor vehicle, in which the loading motor can be connected directly to a hub of the motor vehicle without any intermediate shaft. This also has the advantage that the testing space required is comparatively very much smaller than it usually is in the prior art, and in particular no bulky and expensive testing frame or no corresponding frame structure is required to hold the motor vehicle and the loading motors and orientate them relative to one another. In particular, elaborate and time-consuming orientation or adjustments of the powertrain or the motor vehicle are no longer needed. Yet another essential advantage of the invention can be regarded as that, in particular, the testing process by means of the test stand according to the invention to a large extent does not influence the chassis properties of the motor vehicle to be tested, since the motor vehicle to be tested is supported exclusively by its own chassis on the substrate during the testing process. Thus, advantageously it is also possible to test chassis-specific properties such as the jouncing behavior, the steering behavior and similar properties in a very realistic manner.

Preferably, it is provided that the substrate is a device for holding the at least one loading motor, which for example holds the at least one loading motor at its axial ends in the area of the motor shaft so ensuring that the motor housing can still rotate.

In a preferred embodiment of the invention, it is provided that the at least one torque sensor is arranged in a strut, such that the strut is fixed to the motor housing by way of a first joint eyelet and is fixed to the substrate by way of a second joint eyelet. The strut is preferably a metallic strut whose mechanical load-bearing ability is adapted to the power of the loading motor so that it can safely support the torque applied by the loading motor, whether this be compressive or tensile. The use of joint eyelets for connecting the strut to the motor housing and the substrate has the advantage that no transverse forces can influence the torque measurements adversely. In that the torque sensor is arranged advantageously in the force flow of the strut, it can detect all of the torque reliably.

In a further preferred embodiment of the invention, it is provided that a respective torque sensor is arranged on two lateral sides of the motor housing. In that way each one of the two torque sensors is acted upon by only half the torque, which can result in better measurement accuracy.

With an arrangement of the torque sensors on the lateral sides of the housing, it is advantageously taken into account that by the torque sensors on a first lateral side of the motor housing is detected as a "thrust torque" and the torque detected on the second lateral side is detected as a "tension torque." Preferably, the values of the "thrust torque" and the "tension torque" are added in order to obtain the total torque, which corresponds to the torque delivered by the loading motor as a whole.

According to a further preferred embodiment of the invention, it is provided that a pneumatic tire is fitted onto a radially outer circumference of the at least one static module. In this case the supporting behavior of the static module on the substrate corresponds as closely as possible to the supporting behavior of the powertrain during normal driving operation. This can improve the quality of the test since the behavior of the powertrain in the testing situation is still closer to its behavior during the normal driving operation of the motor vehicle.

Preferably, a pneumatic tire approved for roadway use of the motor vehicle is fitted onto the static module.

In an alternative preferred embodiment of the invention, it is provided that a rubber coating is applied on a radially outer circumference of the at least one static module. The rubber coating also enables a comparatively realistic supporting of the static module on the substrate, but in contrast to a pneumatic tire, does not require any special selection and fitting of a respectively suitable pneumatic tire onto the static module. Instead, the rubber coating can be arranged firmly and permanently on the static module.

According to a further preferred embodiment of the invention, it is provided that the test stand also comprises at least one supporting ram, such that the supporting ram can be adjusted in three spatial directions and/or can rotate about an axis, and such that the supporting ram is designed to support the static module in place of the substrate. By appropriate actuation of the supporting ram, for example along a vertical axis, any unevenness of the ground while the motor vehicle is driving can be simulated. Likewise, almost any other influences of a possible substrate can be simulated by the supporting ram, in particular also in combination with steering movement of steered wheels of the motor vehicle. Since in this case the supporting ram again stands in place of the substrate with which the at least one torque sensor is advantageously connected, it preferably represents a corresponding connection option, in particular for a joint eyelet.

BRIEF DESCRIPTION OF THE DRAWINGS

Below, the invention is explained with reference to the example embodiments illustrated in the figures, which show.

In all the figures the same objects, functional units and comparable components are denoted by the same indexes. These objects, functional units and comparable components are identical as regards their technical features unless explicitly or implicitly indicated otherwise in the description.

DETAILED DESCRIPTION

Figures 1, 2:
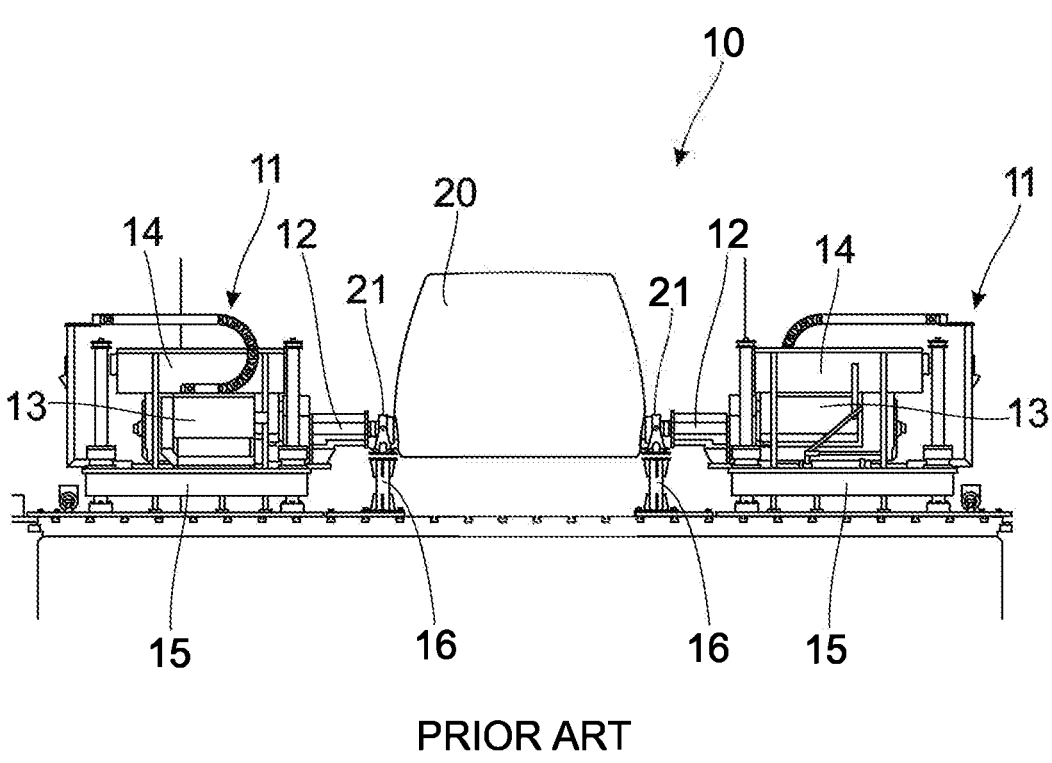
FIG. 1: As an example, and schematically, a test stand known from the prior art for testing a powertrain of a motor vehicle, and the motor vehicle to be tested.
FIG. 2: As an example, and schematically, a possible embodiment of a test stand according to the invention for testing a powertrain of a motor vehicle, and the motor vehicle to be tested.

FIG. 1 shows, as an example and schematically, a test stand 10 known from the prior art for testing a powertrain of a motor vehicle 20, and the motor vehicle 20 to be tested. In this case the powertrain has already been installed completely in the motor vehicle 20. The known test stand 10 comprises two loading units 11, each connected by connecting shafts 12 to hubs 21 of drivable wheels of the motor vehicle 20. However, for all-wheel-driven vehicles test stands 10 of the same type with four loading units are known. For their part, the loading units 11 each comprise a terminal box 14 arranged on an electric drive motor 13 for receiving the cables that supply the electric drive motor 13 with electrical energy. The drive motors 13 are in each case arranged on a frame structure 15, the said frame structures being adjustable sideways in order to be able to be adapted to the track width of different vehicle types. The motor vehicle 20 is usually raised by a lifting device, for example a crane, onto the supporting elements 16 and deposited there. The supporting elements 16 each comprise a receiving mounting for fixing to the hubs of the vehicle wheels. The structure and therefore the space occupied by the known test stand 10 are comparatively large. Since no wheels are fitted on the hubs 21 of the motor vehicle 20, the motor vehicle 20 can also neither be brought to the testing position on the test stand 10 under its own power, nor pushed there.

FIG. 2 shows, as an example and schematically, a possible embodiment of a test stand 100 according to the invention for a powertrain of a motor vehicle 20, and the motor vehicle 20 to be tested. As can be seen, the test stand 100 according to the invention comprises two loading motors 110, which can be arranged directly on the hubs 21 (not shown in FIG. 2) of the motor vehicle 20. Thus, compared with the known test stand 10, the test stand 100 according to the invention is substantially more compact and less costly. In particular, no elaborate orientation of loading units 11 or loading motors 110 relative to the motor vehicle 20 is needed. Furthermore, the motor vehicle 20 can be moved by means of the static modules 130 to the required testing position under its own power. It is also particularly advantageous that by virtue of its configuration, the test stand 100 according to the invention does not need any space-filling frame structures 15.

Figures 3, 4:
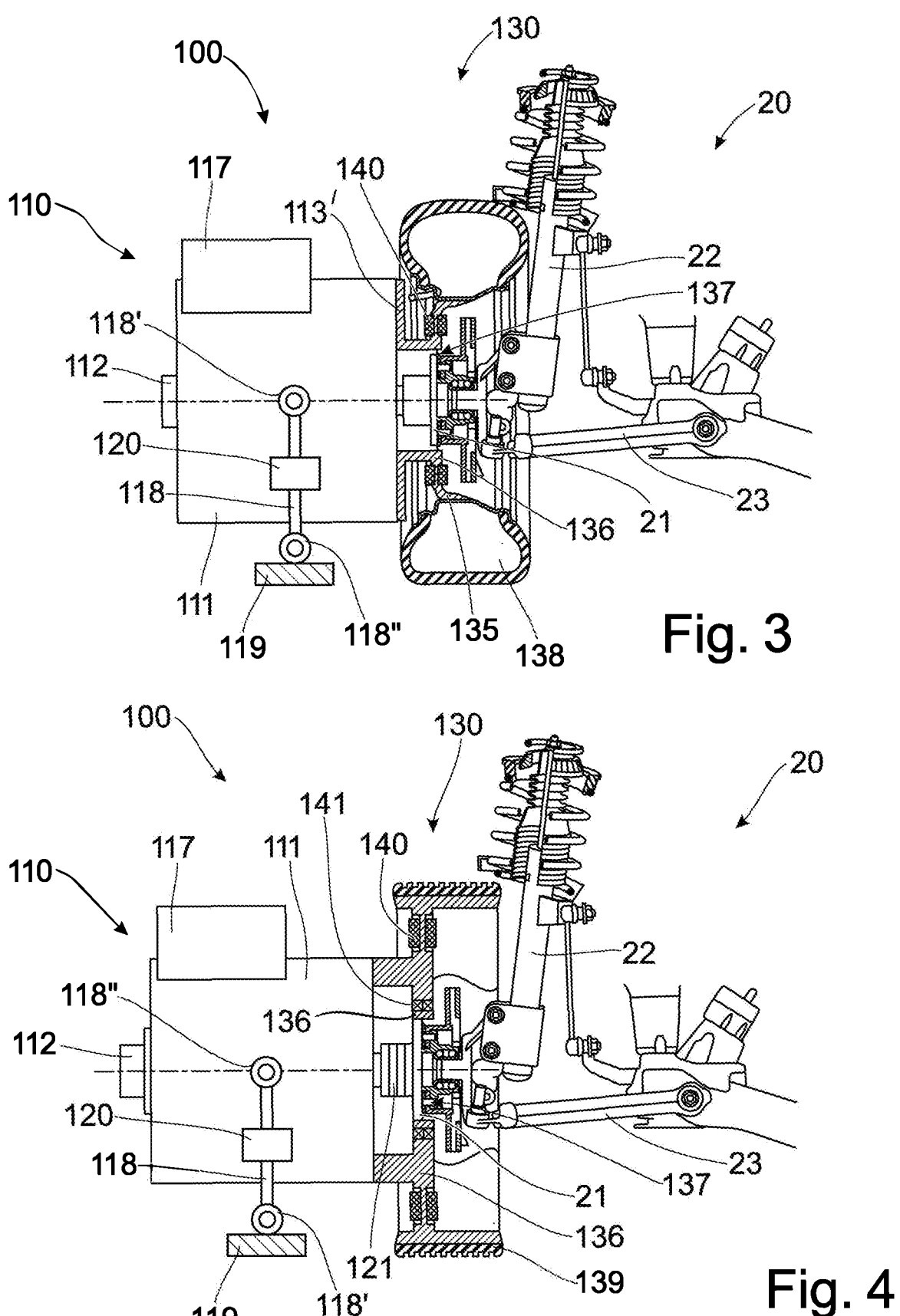
FIG. 3: As an example, and schematically, a possible embodiment of a test stand according to the invention, shown in detail.
FIG. 4: As an example, and schematically, a further possible embodiment of a test stand according to the invention.

FIG. 3 shows in detail, as an example and schematically, a further possible embodiment of a test stand according to the invention. One can see the loading motor 110 in the form of an electric motor 110, which comprises a motor housing 111 and a motor shaft 112. In this example the electric motor 110 is a permanently excited synchro-torque motor 110 with a liquid-cooled motor shaft 112. In this example the motor shaft 112 has a rotary feed-through (not shown in FIG. 3) into which glycol can be introduced as a coolant. Through bores (also not shown) in the motor shaft 112 the glycol flows through the motor shaft 112 and cools it. The synchro-torque motor 110 is in the form of a synchronous motor 110 and in this example comprises twelve permanent-magnetic pole pairs. The comparatively large number of pole pairs enables the loading motor 110 to deliver a comparatively very high torque, even when energized with comparatively small currents. This embodiment also gives the advantage that the loading motor 110 has a comparatively large radial width compared with it axial length. Such electric motors 110 are also known as so-termed "torque motors." In this example, an inverter 117 is arranged directly on the motor housing 111. Alternatively, however, the inverter 117 can be arranged a distance away from the motor housing 111.

Also, to be seen is a static module 130. In this case the loading motor 110 is connected directly to the hub 21 of the motor vehicle 20 by way of a central opening in the static module 130, for example via the wheel flange of the hub 21. Since the hub 21 is at an end of the powertrain of the motor vehicle 20 there is also a driving connection to the powertrain of the motor vehicle 20, so that the powertrain can be loaded and tested by means of the loading motor 110. For its part the motor housing 111 is connected rotationally fixed to the radially middle portion 136 of the static module 130. For its part, by virtue of a bearing. 140 the middle portion 136 is held rotatably in the radially outer portion 135 of the static module 130. This, on the one hand, makes it possible to move the motor vehicle 20 to be tested comparatively simply by virtue of the rotatable outer portion 135, for example to push it, since the middle portion 136 does not rotate with it. On the other hand, it is possible to test the powertrain, since the hub 21 is acted upon by the loading motor with a torque and a rotation speed without the outer portion 135 co-rotating, i.e., so that the motor vehicle 20 remains stationary during the testing process.

On the static module 130, in this example, a pneumatic tire 138 is fitted. In this example the pneumatic tire 138 is a pneumatic tire 138 which is also approved for use on the motor vehicle 20 for road operation. Since the motor vehicle 20 rests on the pneumatic tire 138 during a testing process, the testing behavior of the powertrain of the motor vehicle 20 is very realistic.

A torque sensor 120 is also arranged laterally on the motor housing 111, which is in the force flow of a strut 118 that contains the torque sensor. In this example, the strut has at each end a joint eyelet 118', 118", wherein the first joint eyelet 118' is attached to the motor housing 111 and the second joint eyelet 118" to the substrate 119. In this case the substrate 119 is in the form of a floor plate 119 which has a connection for the second joint eyelet 118". Thus, the torque sensor 120 not only detects the torque produced by the loading motor 110, but it also blocks any rotation movement of the motor housing 111 since the latter is supported rotationally on the substrate. Depending on the direction of rotation of the loading motor 110, the torque sensor 120 is loaded in tension or compression.

The loading motor 110, the torque sensor 120, and the static module 130 together form a possible embodiment of the test stand 100 according to the invention 100. Only part of the motor vehicle 20 can be seen, of which in FIG. 3, for the sake of greater clarity, only a hub 21, a shock-absorber 22 and a wheel linkage 23 are shown.

FIG. 4 shows, as an example and schematically, a further possible embodiment of a test stand 100 according to the invention. The test stand 100 in FIG. 4 differs from the test stand 100 in FIG. 3, firstly in the structure of the static module 130. In this example, instead of a pneumatic tire 138 a rubber coating 139 is arranged on the static module 130.

A further difference of the test stand 100 of FIG. 4 compared with the test stand in FIG. 3 is that instead of a central opening 137, a central inner portion 137 is provided, which by virtue of a second bearing 141, can rotate relative to the radially middle portion 136 which surrounds the central inner portion 141. Furthermore, a compensating clutch 121 is provided in order to compensate angular and radial offsets.

At its end facing toward the static module, the motor housing 111 is connected rotationally fixed to the radially middle portion 136.

Figure 5:
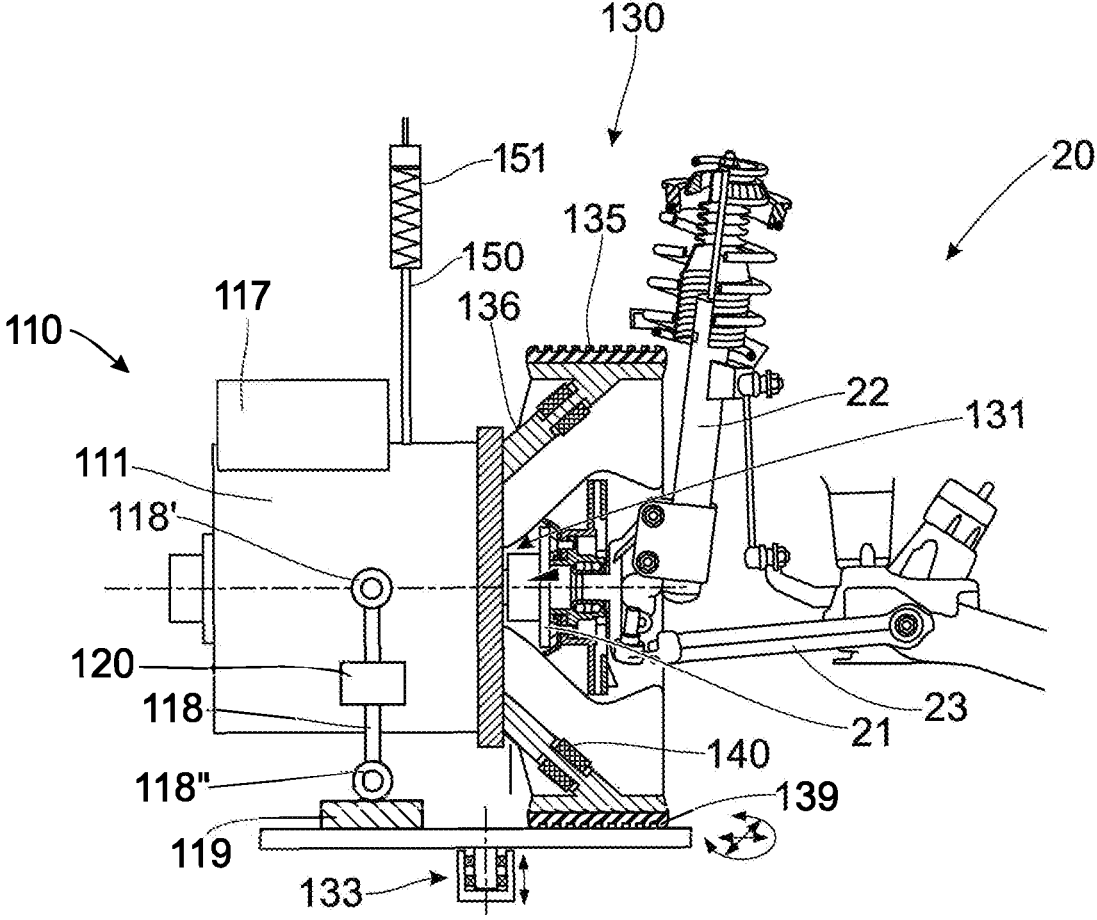
FIG. 5: As an example, and schematically, yet another possible embodiment of a test stand according to the invention.

FIG. 5 shows, as an example and schematically, yet another possible embodiment of a test stand 100 according to the invention. The test stand 100 in FIG. 5 differs from the test stand 100 in FIG. 4, above all, in the presence of a supporting ram 133 which can be adjusted in three spatial directions and rotated about an axis (as indicated by arrows in each case). During the testing process the static module 130 and the loading motor 110 can be supported on the supporting ram 133. By a corresponding actuation of the supporting ram 133 during the testing process, for example ground unevenness during the driving of the motor vehicle 20, can be simulated. Likewise, almost any other influences of a possible substrate can be simulated, particularly also in combination with steering movements of the steered wheels of the motor vehicle 20. In addition, the test stand 100 of FIG. 5 differs by the presence of a motor support 150 which, for example, engages with the motor housing 111 from above and takes up a tilting movement of the loading motor 110 which would otherwise have to be supported on the static module 130. In this example, the motor support 150 is a wire cable 150 which is attached above the test stand 100 to some suitable structure. In this example the motor support 150 also comprises a compensation element 151 containing a spring that can be prestressed, which by adjusting the prestressing of the spring, exactly supports the tilting movement of the loading motor 110.

<div style="text-align:center">INDEXES</div>

10 Test stand
11 Loading unit
12 Connecting shaft
13 Drive motor
14 Terminal box
15 Frame structure
16 Supporting element
20 Motor vehicle
21 Hub
22 Shock absorber
23 Wheel linkage
100 Test stand
110 Loading motor, electric motor, permanently excited
    synchronous motor
111 Motor housing
112 Motor shaft
117 Inverter
118 Strut
118' First joint eyelet
118" Second joint eyelet
119 Substrate, floor plate, holding device
120 Torque sensor
121 Compensation clutch
130 Static module
132 Blocking device
133 Supporting ram
135 Radially outer portion
136 Radially middle portion
137 Central inner portion, central opening
138 Pneumatic tire
139 Rubber coating
140 First bearing
141 Second bearing
150 Motor support, wire cable
151 Compensation element

The invention claimed is:

1. A test stand for a powertrain of a motor vehicle having a hub, the test stand comprising:

at least one loading motor with a motor housing and a motor shaft;

at least one torque sensor; and at least one static module;

wherein the motor shaft is configured to be drivingly connected to the hub of the motor vehicle;

wherein the torque sensor is configured to detect a torque delivered by the loading motor; and wherein the at least one torque sensor is arranged on the motor housing in such manner that it blocks a rotation movement of the motor housing relative to a substrate and supports the torque via the motor housing on the substrate; and wherein the motor vehicle comprises a strut, the at least one torque sensor is arranged in the strut, and wherein the strut is attached by way of a first joint eyelet to the motor housing and by way of a second joint eyelet to the substrate.

2. The test stand according to claim 1, wherein the at least one torque sensor includes a first torque sensor on a first lateral side of the motor housing and a second torque sensor on a second lateral side of the motor housing.

3. The test stand according to claim 1, wherein the motor shaft is configured to be connected rotationally fixed to the hub of the motor vehicle.

4. The test stand according to claim 1, comprising: a pneumatic tire fitted onto a radially outer circumference of the at least one static module.

5. The test stand according to claim 1, comprising: a rubber coating on a radially outer circumference of the at least one static module.

6. The test stand according to claim 1, wherein the at least one static module is configured to be connected to the substrate by friction or with interlock.

7. The test stand according to claim 1, wherein the at least one loading motor is in the form of a permanently excited synchronous motor.

8. The test stand according to claim 1, wherein the test stand also comprises a supporting ram, the supporting ram configured to be adjusted in three spatial directions and/or rotated about an axis, and wherein the supporting ram is configured to support the static module in place of the substrate.

9. The test stand according to claim 1, wherein the motor vehicle includes one or more drivable wheels, the test stand further comprising: a loading motor, a torque sensor, and a static module for each of the one or more drivable wheels of the motor vehicle.

10. The test stand according to claim 1, wherein the at least one static module comprises a radially outer portion and a radially middle portion;

wherein the middle portion is held rotatably in the outer portion; and wherein the middle portion is configured to be connected rotationally fixed to an axial end of the motor housing.

11. The test stand according to claim 10, the middle portion of the static module is configured to be rotationally blocked relative to the outer portion.

12. A test stand for a powertrain of a motor vehicle having a hub, the test stand comprising:

at least one loading motor with a motor housing and a motor shaft;

at least one torque sensor; and at least one static module;

wherein the motor shaft is configured to be drivingly connected to the hub of the motor vehicle;

wherein the torque sensor is configured to detect a torque delivered by the loading motor;

wherein the at least one torque sensor is arranged on the motor housing in such manner that it blocks a rotation movement of the motor housing relative to a substrate and supports the torque via the motor housing on the substrate; and wherein the at least one torque sensor includes a first torque sensor on a first lateral side of the motor housing and a second torque sensor on a second lateral side of the motor housing.

13. The test stand according to claim 12, wherein the motor shaft is configured to be connected rotationally fixed to the hub of the motor vehicle.

14. The test stand according to claim 12, wherein the at least one loading motor is in the form of a permanently excited synchronous motor.

15. The test stand according to claim 12, wherein the motor vehicle includes one or more drivable wheels, the test stand further comprising: a loading motor, a torque sensor, and a static module for each of the one or more drivable wheels of the motor vehicle.

16. A test stand for a powertrain of a motor vehicle having a hub, the test stand comprising:

at least one loading motor with a motor housing and a motor shaft;

at least one torque sensor; and at least one static module;

rubber on a radially outer circumference of the at least one static module;

wherein the motor shaft is configured to be drivingly connected to the hub of the motor vehicle;

wherein the torque sensor is configured to detect a torque delivered by the loading motor; and wherein the at least one torque sensor is arranged on the motor housing in such manner that it blocks a rotation movement of the motor housing relative to a substrate and supports the torque via the motor housing on the substrate.

17. The test stand according to claim 16, wherein the rubber is part of a pneumatic tire.

18. The test stand according to claim 16, wherein the at least one loading motor is an electric motor.

19. The test stand according to claim 16, wherein the motor vehicle includes one or more drivable wheels, and wherein the test stand comprises a loading motor, a torque sensor, and a static module for each of the one or more drivable wheels of the motor vehicle.

20. The test stand according to claim 16, wherein the motor vehicle comprises a strut, the at least one torque sensor is arranged in the strut, and wherein the strut is attached by way of a first joint eyelet to the motor housing and by way of a second joint eyelet to the substrate.

* * * * *